United States Patent Office 3,536,516
Patented Oct. 27, 1970

3,536,516
FLUIDIZED BED PROCESS FOR COATING
ARTICLES WITH POLYLACTONES
Hendrikus A. Oosterhof and Klaas Ruijter, Amsterdam, Netherlands, assignors to Shell Oil Company, New York, N.Y., a corporation of Delaware
No Drawing. Filed Sept. 15, 1967, Ser. No. 668,188
Claims priority, application Great Britain, Oct. 26, 1966, 47,927/66
Int. Cl. C08g 17/02; B44d 1/095
U.S. Cl. 117—21          7 Claims

ABSTRACT OF THE DISCLOSURE

Articles are coated with polylactones by a fluidized bed process which comprises (1) heating the article to be coated to a temperature between 275° and 305° C., (2) dipping the heated article into a fluidized bed of polylactone particles and, optionally, (3) heating the coated article at a temperature of from 225 to 300° C. for a time sufficient to obtain a continuous coating.

BACKGROUND OF THE INVENTION

This invention relates to a fluidized bed process for coating articles with polylactones.

It is well-known to coat articles with resinous materials using fluidized bed techniques wherein a resinous material is maintained in a dense turbulent condition by means of a gaseous stream continuously introduced into the fluidized bed. In general, in carrying out a fluidized bed coating process, the article may be preheated before it is dipped into the fluidized bed. If an article is to be completely coated, it should, of course, be completely immersed in the fluidized bed. The article is preferably moved backwards and forwards in the bed, over a period of time determined by the desired thickness of the coating. After the article has been in contact with the fluidized bed for the desired time, it is removed, excess powder adhering to the article is preferably removed, and the coating cured by heating to a temperature of between about 125° and 225° C., depending, of course, on the particular resin coating system employed.

Thus, the techniques of fluidized bed processes are well-known and need not be described in greater detail.

The present invention is directed specifically to the coating of articles with polylactones. It has been discovered that in order to obtain tough coatings having good adhesion as well as good chemical resistance, it is critical to operate the coating process within certain narrow temperature ranges.

SUMMARY OF THE INVENTION

The present invention is directed to a method of coating articles with polylactones, particularly the poly(beta-lactones). More particularly, the present invention provides a process for coating articles using a fluidized bed technique. The resulting coatings are tough and exhibit excellent adhesion and chemical resistance.

It has now been found that excellent coatings may be obtained when employing polylactones such as polypivalolactone as the thermoplastic resin. Thus, according to the present invention, a process for coating articles is provided in which the article heated to a temperature between 275 and 305° C., is dipped into a fluidized bed of polypivalolactone particles, after which the article having a layer of polypivalolactone adhering to its surface, is removed.

DESCRIPTION OF THE PREFERRED EMBODIMENT

As noted hereinbefore, it is necessary to perform the coating procedure within a relatively narrow temperature range. In order to obtain coatings exhibiting optimum physical properties it is highly desirable to preheat the article to be coated to a limited temperature range as well as to maintain the fluidizing gas within a limited temperature range.

The thermoplastic resins which are suitable for use in the present process are the polylactones prepared by polymerizing the beta-lactones wherein the hydrogens of the beta-propiolactones having a tertiary or quaternary alpha-carbon atom are preferred.

Particularly preferred polylactones are the polymers obtained by polymerizing beta-lactones, particularly the alpha,alpha-dialkyl-beta-propiolactones wherein the alkyl groups contain from 1 to 4 carbon atoms, including those compounds in which the two alkyl groups and the alpha-carbon atom of the lactone ring are combined to form one cyclic structure, such as, for example, 2-oxa-4-spiro [3.6]decanone-1. Suitable examples include alpha,alpha-dimethyl - beta - propiolactone, alpha-methyl-alpha-ethyl-beta-propiolactone, alpha-methyl - alpha-isopropoly-beta-propiolactone, alpha-ethyl-alpha-tert-butyl-propiolactone, alpha,alpha-diisopropyl-propiolactone, etc. The most preferred alpha,alpha-dialkyl-beta-propiolactone is alpha,alpha-dimethyl-beta-propiolactone (pivalolactone).

The poly(beta-lactones) may be prepared by any conventional means, usually in the presence of a suitable catalyst, (see U.S. 3,021,309, U.S. 3,268,486, British 766,347, French 1,231,163 or Belgian 649,828).

Suitable catalysts which may be used in polymerizing the beta-lactones include the primary, secondary or tertiary amines such as trimethylamine, triethylamine, tri-(beta-hydroxyethyl)amine, tripropylamine, triisopropylamine, methyldiethylamine, tri-n-butylamine, diethyl-n-butylamine, dimethylhexylamine, triphenylamine, diethylamine, di-n-propylamine, diisopropylamine, dibutylamine, monobutylamine, monophenylamine, triethylenediamine, hexamethylenetetraamine, and the like. Other catalysts include quaternary ammonium compounds and especially the tetraalkylammonium halides or hydroxides where the alkyl groups contain from 1 to about 4 carbon atoms such as tetraethylammonium bromide, tetrapropylammonium bromide, ethyltriisopropylammonium chloride, tetraethylamonium hydroxide, etc. These catalysts are disclosed in copending U.S. application Ser. No. 388,662, filed Aug. 10, 1964, now Pat. No. 3,268,487.

Another group of very suitable polymerization catalysts are the arsines, stibines and phosphines as well as the addition products thereof. Suitable catalysts of this type are those disclosed in copending U.S. application Ser. No. 363,992, filed Apr. 30, 1964, now Pat. No. 3,268,-486, the description thereof which is incorporated herein by reference. Especially preferred catalysts of this type are the tertiary phosphines and the quaternary phosphonium compounds such as trimethylphosphine, triethylphosphine, tri(beta-chloroethyl)phosphine, tripropylphosphine, triisopropylphosphine, tri-n-butylphosphine, triisobutylphosphine, dimethylhexylphosphine, diethyl-n-pentylphosphine, and diisopropyl-n-butylphosphine, triphenylphosphine, tribenzylphosphine and tritolylphosphine tetrabutylphosphonium bromide, triphenylbutylbutylphosphonium bromide, tetraethylphosphonium hydroxide and ethyltriisopropylphosphonium bromide.

The preferred polylactone is polypivalolactone. By the term "polypivalolactone" is meant a thermoplastic resin which substantially consists of a linear polyester having recurring ester structural units of the formula —O—$CH_2$—C($CH_3$)$_2$—C(O)—. The polyester may readily be prepared by the polymerization of pivalolactone (alpha,alpha-dimethyl-beta-propiolactone) as disclosed by Klootwijk in U.S. 3,268,486. The thermoplastic resin may consist of a polymer obtained from pivalolactone as the sole monomer or may consist of certain copolymers or polymer blends. Thus, copolymer components may be present in the polyester in amounts of up to 25 mol. percent. It is preferred that the copolymeric units be grouped in blocks alternating with blocks of pivalolactone polymer. As copolymer components, lactones are particularly suited, especially β-propiolactones. For example, the copolymers may be derived from copolymerization of pivalolactone with up to 25 mol. percent of alpha,alpha-diethyl-beta-propiolactone or alpha-ethyl-alpha-methyl-beta-propiolactone. Also suitable in the invention are blends of a pivalolactone polymer or copolymer as defined hereinbefore with up to about 25% by weight of other thermoplastic resins such as polyamides like nylon-6 or nylon-12; polyesters like polyethyleneterephthalate; polyvinyl chloride; polyvinyl butyral; polyepoxides (+curing agent); polyolefins like polypropylene and chlorinated polyether resins like "Penton."

Of course, pigments, stabilizers, fillers, nucleating agents and other additives may be present in the polypivalolactone particles. In particular, it is desirable that one or more heat stabilizers and nucleating agents be present in the particles. Suitable heat stabilizers include, among others, thiuram sulphides, dithiocarbamates and xanthogenates, such as copper (II), dimethyldithiocarbamate and tetramethylthiuram disulphide; copper salts of carboxylic acids having a tertiary of quaternary α-carbon atom, such as the copper (II) salt of "Versatic" 1519 (a commercially available carboxylic acid obtained by subjecting a mixture of $C_{14}$–$C_{18}$ alpha-olefins to the Koch reaction); nitroso aromatic compounds, such as 2,4-dinitrosoresorcinol; and phosphites like tris-(nonylphenyl)-phosphite and pentaerythitolphosphite. Very good results are obtained when phosphites are used in combination with one or more other heat stabilizers, such as the preferred combination of tetramethylthiuramdisulphide and tris-(nonylphenyl)-phosphite. These stabilizers are generally used in amounts of 0.1–5% by weight, preferably 0.2–2% by weight based on polypivalolactone. Adequate stabilization may thus be obtained by means of, e.g., 0.1% by weight of tetramethylthiuram disulphide and 0.4% by weight of this-(nonylphenyl)-phosphite.

Examples of nucleating agents which may be incorporated in the polypivalolactone particles are borium nitride and alkali metal halides, such as NaCl and KCl; salts of organic acids, especially salts of carboxylic and sulphonic acids, such as barium benzoate and the sodium salt of 1-naphthalenesulphonic acid. The nucleating agents may be used in amounts up to 5% by weight, preferably 0.1–2% by weight, based on polypivalolactone.

Other additives which may be incorporated in the polypivalolactone particles are light stabilizers such as benzophenones, e.g., 2-hydroxy-4-n-octoxy-benzophenone, and benzotriazoles, e.g., 2-(2-hydroxyphenyl) - benzotriazole. These stabilizers may be used in amounts up to 2% by weight, preferably 0.1–1% by weight, based on polypivalolactone.

Suitable fillers which may be employed as desired, include, among many others, aluminum powder, mica, bentonites, clays, synthetic resins and elastomers, ignited $Al_2O_3$, short-fiber asbestos, wood flours, barytes, carbon black, silica, zinc dust, talc and the like. A large number of fillers are available commercially in particle sizes from about 0.1 micron upward. Other suitable fillers include the pigments which are chemically-stable inorganic or organic pigments such as titania, phthalocyanine blue or green, iron oxide and cadmium red.

The quantity of fillers used is dependent upon many factors such as, cost, particle size, particle shape, absorption characteristics and loading volume. The light weight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 50 phr.; and the heavier fillers may be employed up to about 100 phr. In general, however, in order to optimize raw material costs without minimizing coating properties, the ratio of filler to polyepoxide ranged from about 10 to about 60 phr.

It is generally desirable, although not necessary, to employ a thixotroping agent to prevent dripping or sagging at high film build. Any of the thixotroping agents normally used in the art are suitable for use in the present compositions, including silica aerogels, bentonite clays and their derivatives, castor oil derivatives and the like.

In carrying out the coating process of this invention, the polypivalolactone particles are maintained as a continuously fluidized bed of pulverulent material by means of an evenly distributed current of gas or vapor. Advantageously, the fluidized bed may additionally be stirred, e.g., by an electromotor-driven impeller immersed in the bed. Preferably, the fluidizing gas is heated to a temperature up to about 10° C. below the sintering point of the polypivalolactone particles, i.e., that temperature at which the particles tend to get tacky or sicky. In case of particles containing pivalolactone homopolymer the gas is preferably heated to a temperature below about 190° C., in case of blends with nylon-6 not above about 180° C.

The apparatus in which the coating process of this invention is carried out may consist of any desired type of open container, such as a trough or drum, in which an ascending current of gas which is evenly distributed throughout the cross section of the apparatus, e.g., by means of a porous plate at the bottom of the container, maintains a dense-bed fluidized mass of particles with an upper free surface at least somewhat below the rim of the container.

Usually the fluidizing gas will be air, though it may be advantageous to employ a non-oxidizing gas such as nitrogen or carbon dioxide. The pressure of the fluidizing gas should not exceed the point where the upper level of the fluidized bed of polypivalolactone particles rises above the sides of the container or where an appreciable dust cloud is formed above the container. The minimum effective gas pressure will be about 15 cm. water column with a 0.75 kg./cm.$^2$ gas pressure being generally sufficient to fluidize a 0.5–1 m. bed of polypivalolactone particles.

The article to be coated is heated to a temperature between 275 and 305° C., preferably between 285 and 300° C., before it is dipped into the fluidized bed. The article may be held by a pair of tongs and manually dipped into the fluidized bed, kept in motion while immersed, and then withdrawn. It is also possible to use racks, conveyors or similar article carrying means. According to another method, the heated article is kept stationary while the fluidized bed is moved up around the article. If desired, the article-holder or portions of the article which it is desired not to coat may be covered with a material such as silicone resin of grease-like consistency to provide a suitable masking material.

Depending upon the size and heat capacity of the article to be coated, the thickness of the coating desired, the temperature of the fluidizing gas and the temperature to which the article is preheated before coating, the best dipping time may vary from a fraction of a second up to several minutes. Generally, however, the dipping time is kept below 50 seconds and preferably below 5 seconds.

After the article has been in contact with the fluidized bed for the desired time, it is removed, excess powder adhering to the article may be removed, e.g., by wiping off. Preferably, the coated article is subsequently maintained at a temperature between 230 and 300° C. for a sufficient time, e.g., ½–10 minutes, to obtain a continuous, well melted coating. If desired, the coating process according to the invention may be repeated one or more times so as to build up a thicker coating upon the article.

It is usually necessary, in order to obtain good adhesion of the coating to the surface of the article, to clean and roughen the surfaces, e.g., by means of sand or metal grit blasting or acid-etching. Grease or oil may be removed by a proper treatment with a suitable solvent, such as carbon tetrachloride.

A useful range of particle sizes in the fluidized application of polypivalolactone is substantially of from 25 to 1000 microns, preferably of from 100–500 microns, i.e., at least 90% of the particles should pass through a sieve having a mesh width of 1000 microns, and preferably of 500 microns, and be retained on a sieve having a mesh width of 25 microns, and preferably of 100 microns. It is usually desirable to have as nearly uniform particle size as possible with a view to ease of fluidization and suppression of dust formation. Continuous use of the fluidized polypivalolactone particles usually results in the gradual build-up of excessively large particles which are poorly fluidized. Particles in excess of 1000 micron diameter may continuously or periodically be removed from the powdered material, as, for example, by passing it through a No. 16, preferably a No. 30 BSS sieve. The coarse particles removed in this manner are suitably pulverized and returned to the dip-container. The bulk density of the polypivalolactone particle is suitably within the range of from 0.05 to 0.4 g./ml.

The compositions of the instant invention may also be sprayed as by a compressed air spray gun or electrostatically, i.e., by maintaining a difference in electrostatic change between the particles and the article to be coated.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

EXAMPLE I (a) A stabilized polypivalolactone powder was prepared from a pivalolactone polymer having an intrinsic viscosity of 6, a bulk density of 0.3 and a particle size in the range of 150 to 250 microns. The stabilizers were added to the powder in the form of a solution in toluene in such an amount as to provide 0.05% by weight of tetramethylthiuram disulphide and 0.2% by weight of tris-(nonylphenyl)-phosphite, based on polypivalolactone. The toluene solvent was stripped with nitrogen at 100° C. under vacuum. The articles to be coated were sandblasted steel and glass panels of 3 mm. thickness. A fluidized bed of the stabilized polypivalolactone powder having an average particle size between 150 and 500 microns was then maintained in air at a temperature of 180° C. and the articles, heated to 295° C., were dipped into the bed for 4 seconds, while being moved backwards and forwards in the bed. Hard coatings were obtained having a good adhesion to the substrates and excellent water, chemical, scratching and abrasion resistance.

(b) The coated articles exposed to sunlight and artificial UV light exhibited a better stability than samples similarly coated with nylon 6.6 or polyethylene terephthalate.

(c) When the polypivalolactone powder additionally contained 1% by weight boron nitride as nucleating agent, a beneficial effect upon the size of the spherulites in the coating could be observed, these spherulites generally being less than 0.2 mm. in diameter.

EXAMPLE II

The procedure of Example I is substantially repeated wherein the pulverulent powder consisted of 85% by weight of the polypivalolactone of Example I and 15% by weight of nylon 6.6 and has a particle size range between 150 and 500 microns. Related improved results are obtained.

We claim:

1. A fluidized bed process for seating articles with a polylactone which comprises (1) heating the article to be coated to a temperature between 275° C. and 305° C., (2) dipping said heated article into a fluidized bed of homogeneous, pulverulent resinous particles comprising a poly(beta-lactone) for a time sufficient to deposit a coating of the desired thickness and wherein the fluidizing gas is maintained at a temperature up to about 10° C. below the sintering point of the poly(beta-lactone) and (3) heating said coated article to a temperature from about 230° C. to 300° C. for a time sufficient to obtain a continuous coating.

2. A process as in claim 1 wherein the poly(beta-lactone) is a poly(alpha,alpha-dialkyl-beta-propiolactone) wherein the alkyl groups contain from 1 to 4 carbon atoms.

3. A process as in claim 2 wherein the poly(beta-lactone) is a poly(alpha,alpha-dimethyl-beta-propiolactone).

4. A process as in claim 1 wherein the resinous particles have a particle size range between about 100 and 500 microns.

5. A process as in claim 1 wherein the fluidizing gas is air.

6. A process as in claim 1 wherein the poly(beta-lactone) particles contain at least one heat stabilizer.

7. A process as in claim 6 wherein the heat stabilizers consist essentially of tris-(nonylphenyl)-phosphite and tetramethylthiuram disulfide.

References Cited

UNITED STATES PATENTS

| | | | |
|---|---|---|---|
| 2,844,489 | 7/1958 | Gemmer | 117—21 X |
| 3,021,309 | 2/1962 | Cox et al. | 260—78.3 |
| 3,106,769 | 10/1963 | Goethe et al. | 117—21 X |
| 3,183,113 | 5/1965 | Gemmer | 117—21 |
| 3,205,192 | 9/1965 | Denson | 117—21 X |
| 3,211,695 | 10/1965 | Peterson | 117—21 X |
| 3,268,486 | 8/1966 | Klootwijk | 260—78.3 |
| 3,268,487 | 8/1966 | Klootwijk | 260—78.3 |
| 3,347,692 | 10/1967 | Young et al. | 117—21 |
| 3,382,295 | 5/1968 | Taylor et al. | 117—21 X |
| 3,331,891 | 7/1967 | Thomas et al. | 117—21 X |

MURRAY KATZ, Primary Examiner

P. ATTAGUILE, Assistant Examiner

U.S. Cl. X.R.

260—78.3